US010570709B2

(12) United States Patent
Nguyen

(10) Patent No.: US 10,570,709 B2
(45) Date of Patent: Feb. 25, 2020

(54) REMEDIAL TREATMENT OF WELLS WITH VOIDS BEHIND CASING

(71) Applicant: Halliburton Energy Services, Inc., Houston, TX (US)

(72) Inventor: Philip D. Nguyen, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 16/070,833

(22) PCT Filed: Mar. 24, 2016

(86) PCT No.: PCT/US2016/024074
§ 371 (c)(1),
(2) Date: Jul. 18, 2018

(87) PCT Pub. No.: WO2017/164883
PCT Pub. Date: Sep. 28, 2017

(65) Prior Publication Data
US 2019/0032463 A1 Jan. 31, 2019

(51) Int. Cl.
*E21B 43/08* (2006.01)
*E21B 43/267* (2006.01)
(Continued)

(52) U.S. Cl.
CPC .............. *E21B 43/08* (2013.01); *C09K 8/602* (2013.01); *C09K 8/805* (2013.01); *C09K 8/94* (2013.01);
(Continued)

(58) Field of Classification Search
None
See application file for complete search history.

(56) References Cited

U.S. PATENT DOCUMENTS 4,665,988 A * 5/1987 Murphey ............. C09K 8/5751
166/295
5,422,183 A 6/1995 Sinclair et al.
(Continued)

FOREIGN PATENT DOCUMENTS

EP 0771935 8/2001

OTHER PUBLICATIONS

International Search Report and Written Opinion for PCT/US2016/024074 dated Nov. 28, 2016.

*Primary Examiner* — Andrew Sue-Ako
(74) *Attorney, Agent, or Firm* — Thomas Rooney; C. Tumey Law Group PLLC

(57) ABSTRACT

A variety of systems, methods and compositions are disclosed, including, in one method, a method may comprise pumping a solids containing fluid through a wellbore and into a previously fractured subterranean formation at an injection rate and pressure that is at or above a fracture gradient of the previously fractured subterranean formation, wherein the solids containing fluid comprises a curable resin coated proppant; lowering the injection rate of the solids containing fluid to allow a portion of the curable resin coated proppant to, at least partially, pack and fill one or more voids surrounding a casing disposed in the wellbore; and allowing the portion of the curable resin coated proppant disposed in the one or more voids to cure and form an in situ mechanical screen.

20 Claims, 4 Drawing Sheets

(51) Int. Cl.
    *C09K 8/60*     (2006.01)
    *C09K 8/80*     (2006.01)
    *C09K 8/94*     (2006.01)
    *E21B 33/068*     (2006.01)

(52) U.S. Cl.
    CPC .......... *E21B 33/068* (2013.01); *E21B 43/267* (2013.01); *C09K 2208/30* (2013.01)

(56) References Cited

U.S. PATENT DOCUMENTS

| | | | |
|---|---|---|---|
| 5,791,415 | A | 8/1998 | Nguyen et al. |
| 6,095,244 | A * | 8/2000 | Graham ................. E21B 43/17 166/271 |
| 6,257,335 | B1 | 7/2001 | Nguyen et al. |
| 6,749,023 | B2 | 6/2004 | Nguyen et al. |
| 7,673,686 | B2 | 3/2010 | Nguyen et al. |
| 7,712,531 | B2 | 5/2010 | Nguyen et al. |
| 8,333,241 | B2 | 12/2012 | Dusterhoft et al. |
| 2008/0000636 | A1* | 1/2008 | Misselbrook ......... E21B 43/025 166/276 |
| 2008/0006405 | A1 | 1/2008 | Rickman et al. |
| 2010/0212897 | A1* | 8/2010 | Nguyen ................ E21B 43/267 166/280.1 |
| 2011/0098377 | A1 | 4/2011 | Huang et al. |
| 2015/0315892 | A1 | 11/2015 | McDaniel |

\* cited by examiner

REMEDIAL TREATMENT OF WELLS WITH VOIDS BEHIND CASING

BACKGROUND

During production of fluids from subterranean wells, particulates such as formation fragments, sand, and silt may be carried from the formation into the production flow stream and into the production tubing. The production of these particulates may cause problems both downhole and at the surface. By way of example, during the production of fluids (e.g., hydrocarbons) from near wellbore regions of wells completed certain formations (e.g., shale or ultra-tight sandstone with a permeability less than 1 mD), voids may form behind the casing. These voids may be the results of particulates produced along with production fluids with time. These voids may undesirably impact stability of the well, potentially impacting production. At the surface, these abrasive particulates may deteriorate metals in the tubing, causing leaks and potentially hazardous conditions. The particulates may also fill and clog surface flow lines, vessels, and tanks. In some reservoirs where rod pumping or electric submersible pumps are utilized, the production of particulates may reduce the life of the downhole assembly and increase maintenance costs. Therefore, techniques for reducing particulate production are desired.

BRIEF DESCRIPTION OF THE DRAWINGS

These drawings illustrate certain aspects of the present disclosure, and should not be used to limit or define the disclosure.

DETAILED DESCRIPTION

The systems, methods, and/or compositions disclosed herein may relate to subterranean operations and, in some systems, methods, and compositions, to introduction of a curable resin coated proppant into a wellbore through casing (e.g., casing strings). In particular, the curable resin coated proppant may be used in the treatment of voids behind the casing. Treatment of the voids with the curable resin coated proppant may fill the voids, providing an in-situ mechanical screen that can hold particulates in place while maintaining integrity of the well. The treatment may be applied in a re-fracking operation, where the re-fracking operation is conducted in a subterranean zone after an initial fracking operation has been performed in the subterranean zone.

Figure 1:
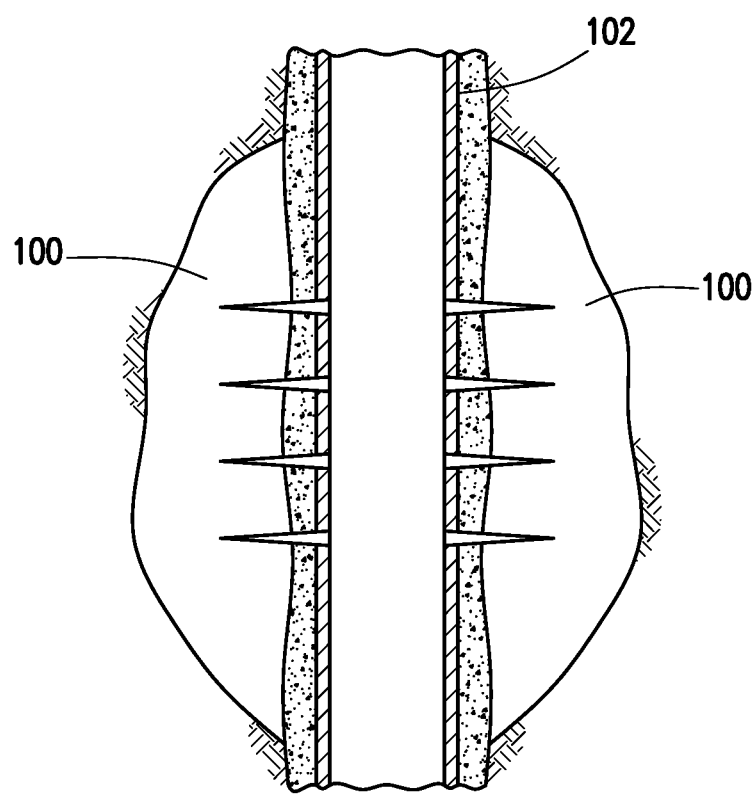
FIG. 1 is a schematic view of example of voids generated around the exterior of casing as a result of solids produced back with production fluids.

FIG. 1 illustrates one or more voids 100 generated around the exterior of casing 102. Without limitation, the voids 100 may result from solids produced back with production fluids. As previously described, the voids 100 may undesirably impact well integrity. The voids 100 may have a size of about a few inches to about several feet deep into the formation surrounding the wellbore.

Figure 2:
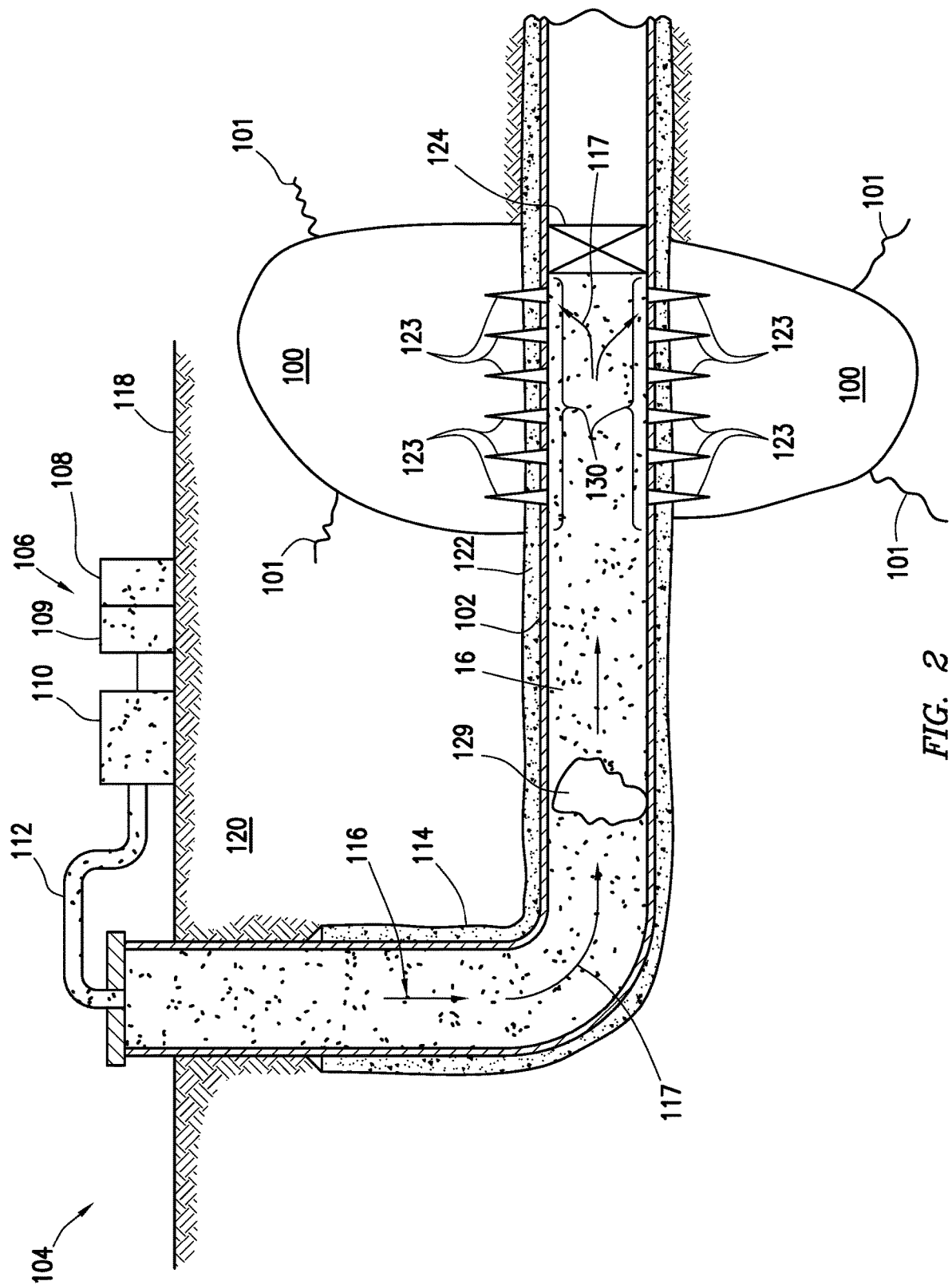
FIG. 2 is a schematic view of an example well system utilized for hydraulic fracturing.

FIG. 2 illustrates an example well system 104 that may be used in treatment of voids 100. The well system 104 may include a fluid handling system 106, which may include fluid supply 108, mixing equipment 109, pumping equipment 110, and wellbore supply conduit 112. Pumping equipment 110 may be fluidly coupled with the fluid supply 108 and wellbore supply conduit 112 to communicate a solids containing fluid 117 containing a curable resin coated proppant 116 into wellbore 114. The fluid supply 108 and pumping equipment 110 may be above the surface 118 while the wellbore 114 is below the surface 118.

The well system 104 may be used for the introduction of the curable resin coated proppant 116 into subterranean formation 120 surrounding the wellbore 114. Generally, a wellbore 114 may include horizontal, vertical, slanted, curved, and other types of wellbore geometries and orientations, and the curable resin coated proppant 116 may generally be applied to subterranean formation 120 surrounding any portion of wellbore 114, including fractures 101 and voids 100. The wellbore 114 may include the casing 102 that may be cemented (or otherwise secured) to the wall wellbore 114 by cement sheath 122. Perforations 123 may allow the curable resin coated proppant 116 to flow into the subterranean formation 120. As illustrated, perforations 123 may penetrate casing 102 and cement sheath 122 allowing communication between interior of casing 102 and voids 100. A plug 124, which may be any type of plug for oilfield applications (e.g., bridge plug), may be disposed in wellbore 114 below the perforations 123.

In accordance with systems, methods, and/or compositions of the present disclosure, a perforated interval of interest 130 (depth interval of wellbore 114 including perforations 123) may be isolated with plug 124. The curable resin coated proppant 116 may be mixed with water (or other suitable base fluid) via mixing equipment 109, thereby forming a solids containing fluid 117, and then may be pumped via pumping equipment 110 from fluid supply 108 down the interior of casing 102 and into subsurface formation 120. Alternatively, the curable resin coated proppant 116 may be pumped down production tubing, coiled tubing, or a combination of coiled tubing and annulus between the coiled tubing and the casing 102. Ratios of water to proppant may range from about 0.5 lbm/gal to about 5 lbm/gal. The initial pumping rates may range from about 15 bbl/min to about 80 bbl/min, enough to effectively create a fracture into the formation.

The pumping equipment 110 may include a high pressure pump. As used herein, the term "high pressure pump" refers to a pump that is capable of delivering the solids containing fluid 117 downhole at a pressure of about 1000 psi or greater. A high pressure pump may be used when it is desired to introduce the solids containing fluid 117 into subterranean formation 120 at or above a fracture gradient of the subterranean formation 120, but it may also be used in cases where fracturing is not desired. Additionally, the high pressure pump may be capable of fluidly conveying particulate matter, such as the curable resin coated proppant, into the subterranean formation 120. Suitable high pressure pumps may include, but are not limited to, floating piston pumps and positive displacement pumps.

Alternatively, the pumping equipment 110 may include a low pressure pump. As used herein, the term "low pressure pump" refers to a pump that operates at a pressure of about 1000 psi or less. A low pressure pump may be fluidly coupled to a high pressure pump that may be fluidly coupled to a tubular (e.g., wellbore supply conduit 112). The low pressure pump may be configured to convey the solids containing fluid 117 to the high pressure pump. The low pressure pump may "step up" the pressure of the solids containing fluid 117 before it reaches the high pressure pump.

Mixing equipment 109 may include a mixing tank that is upstream of the pumping equipment 110 and in which the solids containing fluid 117 may be formulated. The pumping equipment 110 (e.g., a low pressure pump, a high pressure pump, or a combination thereof) may convey solids containing fluid 117 from the mixing equipment 109 or other source of the solids containing fluid 117 to the casing 102. Alternatively, the solids containing fluid 117 may be formulated offsite and transported to a worksite, in which case the solids containing fluid 117 may be introduced to the casing 102 via the pumping equipment 110 directly from its shipping container (e.g., a truck, a railcar, a barge, or the like) or from a transport pipeline. In either case, the solids containing fluid 117 may be drawn into the pumping equipment 110, elevated to an appropriate pressure, and then introduced into the casing 102 for delivery downhole.

The curable resin coated proppant 116 may enter the voids 100 of subterranean formation 120 surrounding wellbore 114 by way of perforations 123. Perforations 123 may extend from the interior of casing 102, through cement sheath 122, and into voids 100. The curable resin coated proppant 116 may be pumped at or above the fracture gradient of the subsurface formation 120. Pumping the curable resin coated proppant 116 at or above the fracture gradient of the subsurface formation 120 may create (or enhance) at least one fracture (e.g., fractures 101) extending from the voids 100 into the subsurface formation 120. At least a portion of the curable resin proppant 116 may enter fractures 101.

Figure 4:
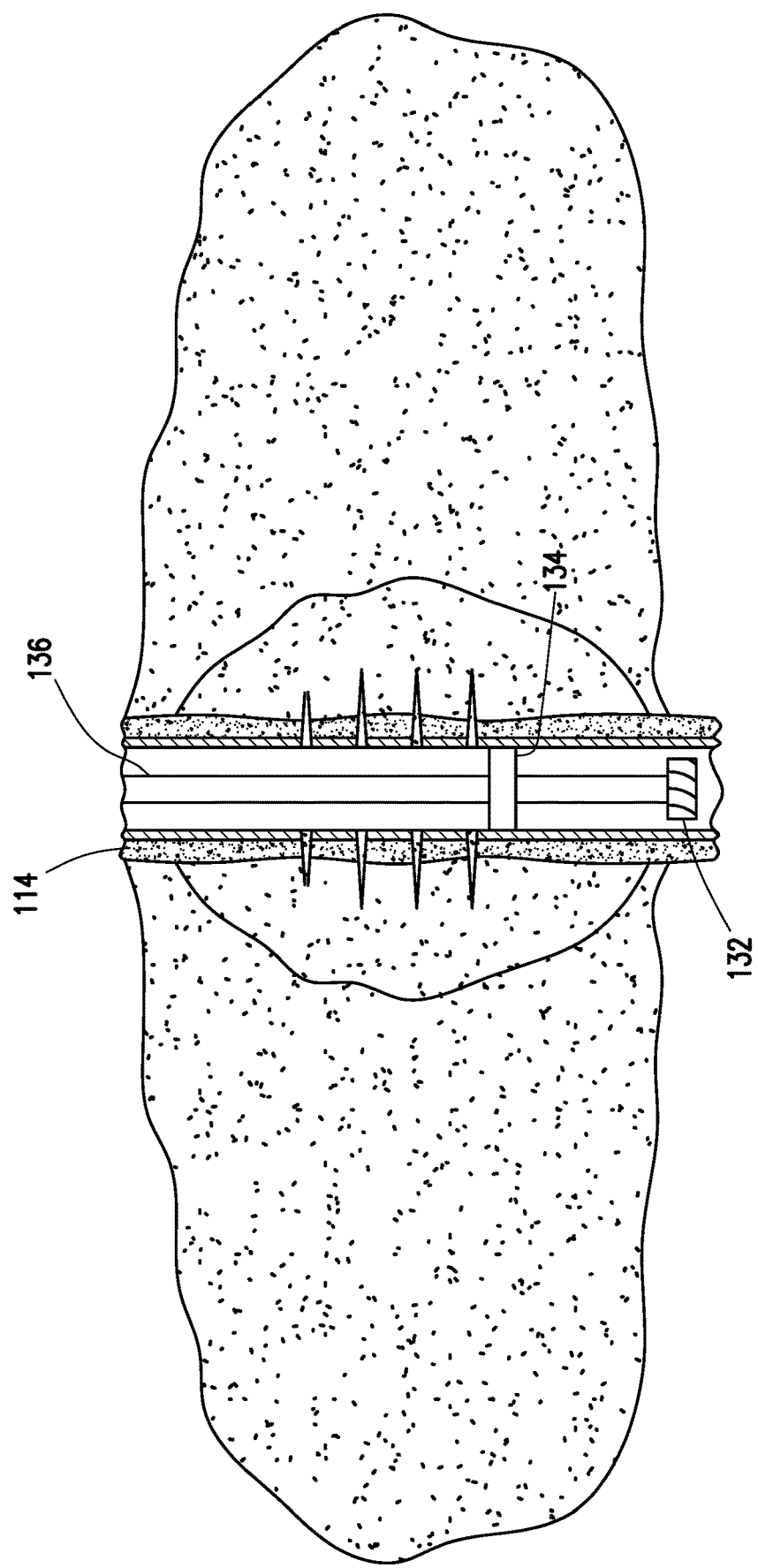
FIG. 4 is a schematic view of an example of a wellbore being drilled and/or reamed out after displacement of a curable resin coated proppant.

After entering voids 100 and/or fractures 101 of subterranean formation 120, pumping equipment 110 may lower the pumping rate to allow the curable resin coated proppant 116 to squeeze and (100%) pack the volume (space) of voids 100 and/or fractures 101. The lower pumping rates may range from about 1 to about 10 bbl/min. Without limitation, the curable resin coated proppant 116 may pack about 75% or more, about 50% or more, about 25% or more, or about 10% or more of the volume (space) of voids 100 and/or fractures 101 ("packing percentages"). The packing percentages of the voids 100 and/or fractures 101 may differ from one another. The curable resin coated proppant 116 may permanently remain in the voids 100 and/or fractures 101, whereas, the curable resin coated proppant 116 that may have filled (during pumping) the wellbore 114 at the perforated interval of interest 130 may semi-cure, thereby forming a partially hardened mass 129 in the wellbore 114, before being drilled and/or reamed out. Wellbore 114 may be drilled and/or reamed out with drill string 136, wherein drill string 136 may include reamer 134 and drill bit 132 (shown in FIG. 4).

Squeezing may be a remedial process of utilizing pump pressure to inject or squeeze a treatment fluid comprising the curable resin coated proppant 116 into problematic voids 100 at the perforated interval of interest 130. Squeezing may be performed at any time during the life of a well: drilling, completions or producing phases. Depending on the remediation need, squeezing may be performed above or below the fracture gradient of the subsurface formation 120 (high pressure squeeze and low pressure squeeze, respectively).

Figure 3:
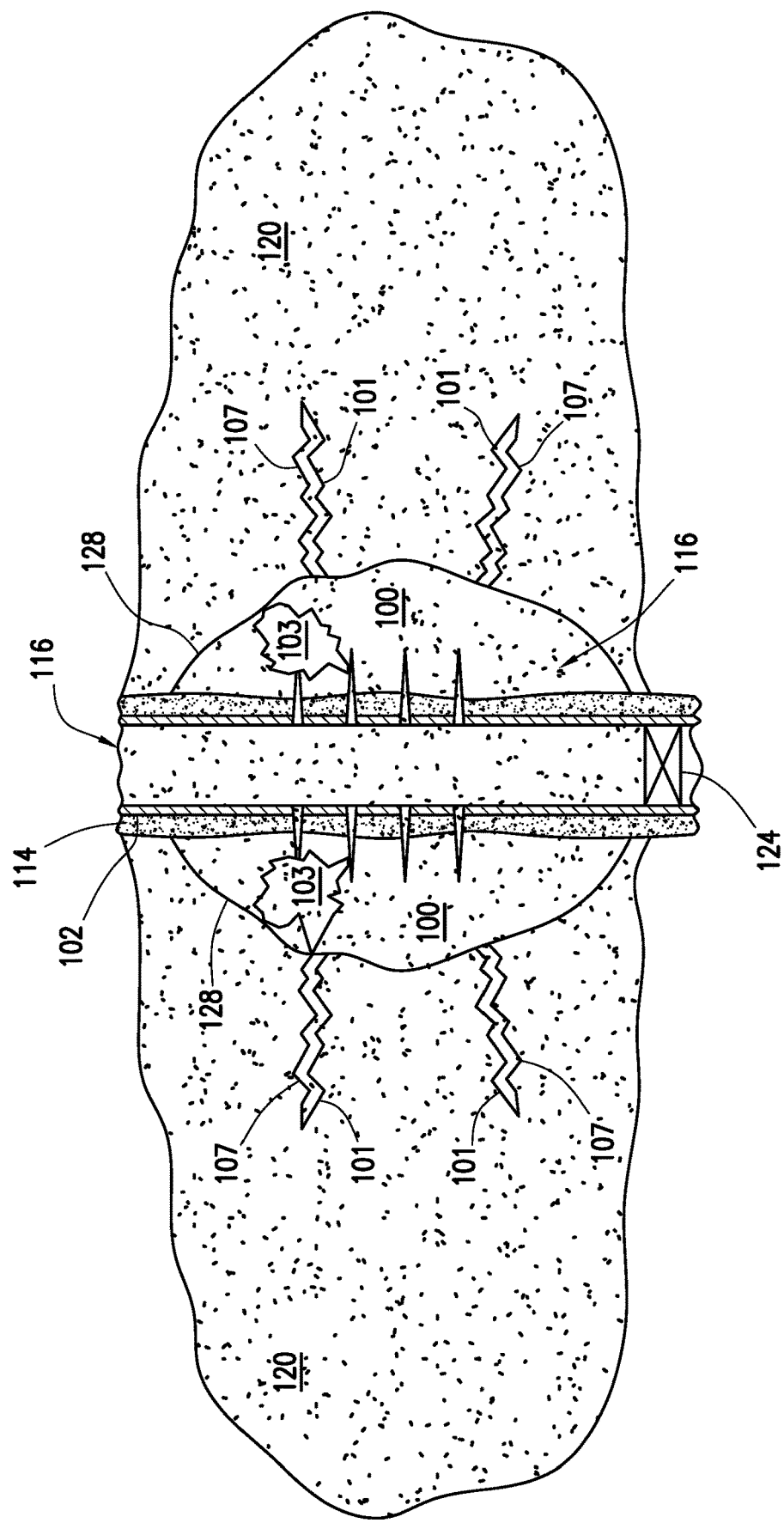
FIG. 3 is a schematic view of an example of a wellbore after displacement of a curable resin coated proppant.

Referring to FIG. 3, the wellbore 114 is shown after displacement of the curable resin coated proppant 116 in accordance with systems, methods, and compositions of the present disclosure. As illustrated, the curable resin coated proppant 116 may be disposed in the voids 100 between the exterior of casing 102 and walls 128 (walls 128 define the boundaries of voids 100), and within the fractures 101. The curable resin coated proppant 116 may consolidate any solids in the voids 100. Additionally, the curable resin coated proppant 116 may prop open fractures 101 and consolidate any solids in the fractures 101.

During consolidation, the curable resin coated proppant 116 may form in-situ mechanical screens 103 within voids 100 and/or fractures 101. The in-situ mechanical screens 103 may be of a lattice structure. The in-situ mechanical screens 103 may attach (via adhesion because the resin may be sticky) to the walls 128, walls 107 (walls 107 define the boundaries of fractures 101), and any solids in the voids 100 and/or fractures 101. The in-situ mechanical screens 103 may attach to about 100% of the surface area of the walls 128, the walls 107, and any solids in the voids 100 and/or fractures 101 ("attachment percentages"). The attachment percentages for the surface area of the walls 128, surface area of the walls 107, and for the solids may differ from one another (e.g., the in-situ mechanical screens 103 may attach to about 100% of the surface area of the walls 128, about 50% of the walls 107, and about 75% of the solids located in the voids 100 and/or fractures 101). After attachment, the in-situ mechanical screens 103 may cure (harden), forming a hardened resin lattice-structured layer covering the walls 128, as well as, covering the walls 107 and any solids within voids 100 and/or fractures 101. Curing times may range from a few hours to a few days depending on downhole temperature. Resin curing kinetics may minimize premature curing of the coated resin.

After consolidation, the in-situ mechanical screens 103 may prevent (or reduce) the migration of solids (the in-situ mechanical screens 103 may not be permeable to solids) from voids 100 and/or fractures 101 into a production stream (e.g., produced hydrocarbons). However, the in-situ mechanical screens 103 may still allow the production of fluids (e.g., hydrocarbons) from the subterranean formation 120 into the casing 102 or any production tubing (e.g., production liners). Permeability of the resin coated proppant may be greater than about 100 Darcies.

The fractures 101 may provide highly conductive flow paths while the in-situ mechanical screens 103 may hold the solids in place, in order to maintain production of the well.

The aforementioned description may be applied to and repeated for one or more intervals of interest.

Resins suitable for coating the curable resin coated proppant 116 for use in a solids containing fluid 117 may include any resin that is capable of forming a hardened, consolidated mass. Many such resins are commonly used in consolidation treatments, and some suitable resins include, without limitation, two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof some suitable resins, such as epoxy resins, may be cured with an internal catalyst or activator so that when pumped downhole, they may be cured using only time and temperature. Other suitable resins, such as furan resins may generally require a time-delayed catalyst or an external catalyst to help activate the polymerization of the resins if the cure temperature is low (i.e., less than 250° F.) but may cure under the effect of time and temperature if the formation temperature is above about 250° F., preferably above about 300° F.

Selection of a suitable resin may be affected by the temperature of the subterranean formation 120 to which the solids containing fluid 117 may be introduced. By way of example, for subterranean formation 120 having a bottom hole static temperature ("BHST") ranging from about 60° F. to about 250° F., two component epoxy based resins comprising a hardenable resin component and a hardening agent component may be preferred. For subterranean formation 120 having a BHST ranging from about 300° F. to about 600° F., a furan based resin may be preferred, for example. For subterranean formation 120 having a BHST ranging from about 200° F. to about 400° F., either a phenolic based resin or a one component HT epoxy based resin may be suitable, for example. For subterranean formation 120 having a BHST of at least about 175° F., a phenol/phenol formaldehyde/furfuryl alcohol resin may also be suitable, for example. With the benefit of this disclosure, one of ordinary skill in the art should be able to recognize and select a suitable resin for use in consolidation treatment applications.

In some examples, a solvent may be used with the curable resin coated proppant 116 in the solids containing fluid 117. Any solvent that is compatible with the chosen resin and achieves the desired viscosity effect may be suitable for use. Some preferred solvents are those having high flash points (e.g., about 125° F.); such solvents may include, but are not limited to, butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d-limonene, fatty acid methyl esters, or combinations thereof. Other solvents may include aqueous dissolvable solvents such as, methanol, isopropanol, butanol, glycol ether solvents, and combinations thereof. Suitable glycol ether solvents may also be used, examples may include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent may be dependent on the resin chosen.

The solids containing fluid 117 may comprise any number of additional additives, including, but not limited to, salts, surfactants, acids, fluid loss control additives, gas, foamers, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents, particulate materials (e.g., proppant particulates) and any combination thereof. In certain systems, methods, and/or compositions, the solids containing fluid 117 may comprise an activator or catalyst which may be used, inter alia, to activate the polymerization of the resin. With the benefit of this disclosure, one of ordinary skill in the art should be able to recognize and select a suitable additive for use in the solids containing fluid 117.

Examples of the solids containing fluid 117 that may be used in accordance with the present disclosure may include aqueous fluids, non-aqueous fluids, slickwater fluids, aqueous gels, viscoelastic surfactant gels, foamed gels, and emulsions, for example. Examples of suitable aqueous fluids may include fresh water, saltwater, brine, seawater, and/or any other aqueous fluid that may not undesirably interact with the other components used in accordance with the present disclosure or with the subterranean formation 120. Examples of suitable non-aqueous fluids may include organic liquids, such as hydrocarbons (e.g., kerosene, xylene, toluene, or diesel), oils (e.g., mineral oils or synthetic oils), esters, and any combination thereof. Suitable slickwater fluids may generally be prepared by addition of small concentrations of polymers to water to produce what is known in the art as "slick-water." Suitable aqueous gels may generally comprise of an aqueous fluid and one or more gelling agents. Suitable emulsions may be comprised of two immiscible liquids such as an aqueous fluid or gelled fluid and a hydrocarbon. Foams may be created by the addition of a gas, such as carbon dioxide or nitrogen. Additionally, the solids containing fluid 117 may be an aqueous gel comprised of an aqueous fluid, a gelling agent for gelling the aqueous fluid and increasing its viscosity, and, optionally, a crosslinking agent for crosslinking the gel and further increasing the viscosity of the fluid. The increased viscosity of the gelled, or gelled and crosslinked, treatment fluid, inter alia, may reduce fluid loss and may allow the solids containing fluid 117 to transport significant quantities of suspended particulates. The density of the solids containing fluid 117 may be increased to provide additional particle transport and suspension in some applications.

In certain systems, methods, and/or compositions of the present disclosure, a friction reducer may be used. The friction reducer may be included in the solids containing fluid 117 to form a slickwater fluid, for example. The friction reducing polymer may be a synthetic polymer. Additionally, for example, the friction reducing polymer may be an anionic polymer or a cationic polymer. By way of example, suitable synthetic polymers may comprise any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof.

Suitable friction reducing polymers may be in an acid form or in a salt form. As will be appreciated, a variety of salts may be prepared, for example, by neutralizing the acid form of the acrylic acid monomer or the 2-acrylamido-2-methylpropane sulfonic acid monomer. In addition, the acid form of the polymer may be neutralized by ions present in the solids containing fluid 117. The term "polymer" in the context of a friction reducing polymer, may be intended to refer to the acid form of the friction reducing polymer, as well as its various salts.

The friction reducing polymer may be included in the solids containing fluid 117, for example, in an amount equal to or less than 0.2% by weight of the water present in the solids containing fluid 117. The friction reducing polymers may be included in the solids containing fluid 117 in an amount sufficient to reduce friction without gel formation upon mixing. By way of example, the solids containing fluid 117 comprising the friction reducing polymer may not exhibit an apparent yield point. While the addition of a friction reducing polymer may minimally increase the viscosity of the solids containing fluid 117, the polymers may generally not be included in the example solids containing fluid 117 in an amount sufficient to substantially increase the viscosity. For example, when proppant is included in the solids containing fluid 117, velocity rather than fluid viscosity generally may be relied on for proppant transport. Additionally, the friction reducing polymer may be present in an amount in the range from about 0.01% to about 0.15% by weight of the water. Alternatively, the friction reducing polymer may be present in an amount in the range from about 0.025% to about 0.1% by weight of the water.

In some systems, methods, and/or compositions, the solids containing fluid 117 may further comprise an additive including, but not limited to, a salt; a weighting agent; an inert solid; a fluid loss control agent; an emulsifier; a dispersion aid; a corrosion inhibitor; an emulsion thinner; an emulsion thickener; a viscosifying agent; a high-pressure, high-temperature emulsifier-filtration control agent; a surfactant; a particulate; a lost circulation material; a foaming agent; a gas; a pH control additive; a breaker; a biocide; a crosslinker; a stabilizer; a chelating agent; a scale inhibitor; a mutual solvent; an oxidizer; a reducer; a friction reducer; a clay stabilizing agent, a consolidating agent; a complexing agent; and any combination thereof.

The curable resin coated proppant 116 suitable for use in accordance with systems, methods, and compositions of the present disclosure may comprise a wide variety of particulate material suitable for use in subterranean operations onto which the resin may be coated. Without limitation, the curable resin coated proppant 116 may include a variety of particulate materials, including, but not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. Without limitation, the particular material may comprise graded sand. Other suitable particulates that may be suitable for use in subterranean applications may also be useful.

Without limitation, the curable resin coated proppant 116 may have a particle size in a range from about 2 mesh to about 400 mesh, U.S. Seive Series. By way of example, the curable resin-coated proppant may have a particle size of about 10 mesh to about 70 mesh with distribution ranges of 10-20 mesh, 20-40 mesh, 40-60 mesh, or 50-70 mesh, depending, for example, on the particle sizes of the formation particulates to be screen out.

The curable resin coated proppant 116 may be carried by the solids containing fluid 117. Without limitation, the curable resin coated proppant 116 may be present in the solids containing fluid 117 in a concentration of about 0.1 pounds per gallon to about 10 pound per gallon (ppg), about 0.2 ppg to about 0.6 ppg. These ranges encompass every number in between, for example. the concentration may range between about 0.5 ppg to about 4 ppg. One of ordinary skill in the art with the benefit of this disclosure should be able to select an appropriate amount of the nano- and micron-sized proppant to use for a particular application.

At least a portion of the subterranean formation 120 may have a permeability ranging from a lower limit of about 0.1 nano Darcy (nD), 1 nD, 10 nD, 25 nD, 50 nD, 100 nD, or 500 nD to an upper limit of about 10 mD, 1 mD, 500 microD, 100 microD, 10 microD, or 500 nD, and wherein the permeability may range from any lower limit to any upper limit and encompass any subset therebetween. Without limitation, the subterranean formation 120 may be considered an ultra-tight formation, for example, having a permeability of about 1 mD or less, which may be a shale formation, sandstone formation, or other type of rock formation.

A method may comprise pumping a solids containing fluid through a wellbore and into a previously fractured subterranean formation at an injection rate and pressure that is at or above a fracture gradient of the previously fractured subterranean formation, wherein the solids containing fluid comprises a curable resin coated proppant; lowering the injection rate of the solids containing fluid to allow a portion of the curable resin coated proppant to, at least partially, pack and fill one or more voids surrounding a casing disposed in the wellbore; and allowing the portion of the curable resin coated proppant disposed in the one or more voids to cure and form an in situ mechanical screen. This method may include any of the various features of the compositions, methods, and systems disclosed herein, including one or more of the following features in any combination. The method may also comprise producing a production fluid from the previously fractured subterranean formation into the wellbore, wherein the in-situ mechanical screen inhibits production of formation particulates with the production fluid. The solids containing fluid may comprise aqueous fluids, non-aqueous fluids, slickwater fluids, aqueous gels, viscoelastic surfactant gels, foamed gels, and/or emulsions. The method may also comprise fracturing the subterranean formation after the introducing the curable resin coated proppant into the one or more voids located around an exterior of the wellbore. A portion of the curable resin coated proppant may fill a portion of the wellbore. The method may also comprise drilling or reaming out a consolidated mass formed by the portion of the curable resin coated proppant in the wellbore. The method may also comprise isolating with a plug an interval of interest before the pumping the curable resin coated proppant. The curable resin coated proppant may comprise graded sand coated with an epoxy resin. The curable resin coated proppant may comprise a particulate material coated with a resin, wherein the resin may comprise at least one resin selected from the group consisting of an epoxy resin, a two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. The previously fractured subterranean formation may have a permeability of about 100 millidarcies or less. The curable resin coated proppant may be pumped in the solids containing fluid at a concentration of about 0.1 pounds to about 10 pounds per gallon.

A system may comprise a curable resin coated proppant, wherein the curable resin coated proppant may comprise a particulate material coated with a curable resin coating that may be filling and attachable to a wall of one or more voids positioned around an exterior of a casing string in a previously fractured subterranean formation; and pumping equipment capable of pumping the proppant down a wellbore at a first rate to fracture the previously fractured formation and at a lower rate to, at least partially, pack and fill the one or more voids. This system may include any of the various features of the compositions, methods, and systems disclosed herein, including one or more of the following features in any combination. The system may also comprise mixing equipment capable of mixing the curable resin coated proppant with an aqueous fluid. The casing string may comprise perforations extending into the previously fractured subterranean formation. The pumping equipment may be capable of pumping the proppant at or above a fracture gradient of the previously fractured subterranean formation. The particulate material may comprise graded sand and the curable resin may comprise an epoxy resin. The curable resin may comprises at least one resin selected from the group consisting of an epoxy resin, a two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof.

An in-situ mechanical screen may comprise a lattice structure of a curable resin coated proppant, wherein the curable resin coated may comprise particulates materials coated with a curable resin; wherein the in-situ mechanical screen may be disposed in one or more voids located around an exterior of a wellbore, the wellbore penetrating a previously fractured subterranean formation. This in-situ mechanical screen may include any of the various features of the compositions, methods, and systems disclosed herein, including one or more of the following features in any combination. The curable resin may comprise at least one resin selected from the group consisting of an epoxy resin, a two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. The in-situ mechanical screen may be permeable to a production fluid located in the previously fractured subterranean formation. The previously fractured subterranean formation may have a permeability of about 100 millidarcies or less.

The present disclosure is well adapted to attain the ends and advantages mentioned as well as those that are inherent therein. The particular systems, methods, and/or applications disclosed above are illustrative only, as the present disclosure may be modified and practiced in different but equivalent manners apparent to those skilled in the art having the benefit of the teachings herein. Although individual systems, methods, and compositions are discussed, the disclosure covers all combinations of all those systems, methods, and compositions. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative systems, methods, and compositions disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method comprising:
pumping a solids containing fluid through a wellbore and into a previously fractured subterranean formation at an injection rate and pressure that is at or above a fracture gradient of the previously fractured subterranean formation, wherein the solids containing fluid comprises a curable resin coated proppant;
lowering the injection rate of the solids containing fluid to allow a portion of the curable resin coated proppant to, at least partially, pack and fill one or more voids surrounding a casing disposed in the wellbore, wherein the one or more voids are the result of solids produced back with production fluids; and
allowing the portion of the curable resin coated proppant disposed in the one or more voids to cure and form an in-situ mechanical screen.

2. The method of claim 1, further comprising:
preventing migration of formation particulates, from the one or more voids, with the in-situ mechanical screen during production of a subterranean fluid.

3. The method of claim 1, wherein the solids containing fluid comprises at least one fluid selected from the group consisting of aqueous fluids, non-aqueous fluids, slickwater fluids, aqueous gels, viscoelastic surfactant gels, foamed gels, emulsions, and combinations thereof.

4. The method of claim 1, further comprising fracturing the subterranean formation after the introducing the curable resin coated proppant into the one or more voids located around an exterior of the wellbore.

5. The method of claim 1, wherein a portion of the curable resin coated proppant fills a portion of the wellbore, the method further comprising drilling or reaming out a consolidated mass formed by the portion of the curable resin coated proppant in the wellbore.

6. The method of claim 1, further comprising isolating with a plug an interval of interest before the pumping the curable resin coated proppant.

7. The method of claim 1, wherein the curable resin coated proppant comprises graded sand coated with an epoxy resin.

8. The method of claim 1, wherein the curable resin coated proppant comprises a particulate material coated with a resin, wherein the resin comprises at least one resin selected from the group consisting of an epoxy resin, a two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof.

9. The method of claim 1, wherein the previously fractured subterranean formation has a permeability of about 100 millidarcies or less.

10. The method of claim 1, wherein the curable resin coated proppant is pumped in the solids containing fluid at a concentration of about 0.1 pounds to about 10 pounds per gallon.

11. A system comprising:
a curable resin coated proppant, wherein the curable resin coated proppant comprises a particulate material coated with a curable resin coating that is filling and attached to a wall of one or more voids positioned around an exterior of a casing string in a previously fractured subterranean formation, wherein the one or more voids are the result of solids produced back with production fluids; and
pumping equipment capable of pumping the curable resin coated proppant down a wellbore at a first rate to fracture the previously fractured formation and at a lower rate to, at least partially, pack and fill the one or more voids.

12. The system of claim 11, further comprising
formation particulates within the one or more voids and a portion of the curable resin coated proppant; and at least one in-situ mechanical screen positioned downstream, the at least one in-situ mechanical screen comprising another portion of the curable resin coated proppant.

13. The system of claim 11, wherein the casing string comprises perforations extending into the previously fractured subterranean formation.

14. The system of claim 11, wherein the pumping equipment is capable of pumping the proppant at or above a fracture gradient of the previously fractured subterranean formation.

15. The system of claim 11, wherein the particulate material comprises graded sand and the curable resin comprises an epoxy resin.

16. The system of claim 11, wherein the curable resin comprises at least one resin selected from the group consisting of an epoxy resin, a two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof.

17. A system comprising:
at least one lattice structure of a curable resin coated proppant comprising particulates coated with a curable resin, wherein the lattice structure is disposed in one or more voids located around an exterior of a wellbore, the wellbore penetrating a previously fractured subterranean formation, wherein the one or more voids are the result of solids produced back with production fluids.

18. The system of claim 17, wherein the curable resin comprises at least one resin selected from the group consisting of an epoxy resin, a two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof.

19. The system of claim 17, further comprising formation particulates within the one or more voids and the curable resin coated proppant and positioned upstream to the lattice structure.

20. The system of claim 17, wherein the previously fractured subterranean formation has a permeability of about 100 millidarcies or less.

* * * * *